United States Patent
Lin

(10) Patent No.: US 7,055,842 B1
(45) Date of Patent: Jun. 6, 2006

(54) FOLDING ELECTRIC BICYCLE

(75) Inventor: Li-Ju Lin, Kaohsiung (TW)

(73) Assignee: Kentfa Advanced Technology Corp., Kaohsiung (TW)

( * ) Notice: Subject to any disclaimer, the term of this patent is extended or adjusted under 35 U.S.C. 154(b) by 0 days.

(21) Appl. No.: 11/013,428

(22) Filed: Dec. 17, 2004

(51) Int. Cl.
*B62M 15/00* (2006.01)

(52) U.S. Cl. ............... 280/278; 280/287; 292/163; 292/164; 292/173; 292/174; 292/175

(58) Field of Classification Search ............... 280/278, 280/287; 292/163, 164, 173, 174, 175
See application file for complete search history.

(56) References Cited

U.S. PATENT DOCUMENTS

| | | | | |
|---|---|---|---|---|
| 3,746,367 A | * | 7/1973 | Johannsen | 280/301 |
| 4,045,048 A | * | 8/1977 | Irwin | 280/278 |
| 4,296,940 A | * | 10/1981 | Herbert | 280/278 |
| 4,443,023 A | * | 4/1984 | Ishibashi | 280/278 |
| 4,460,191 A | * | 7/1984 | Ishibashi et al. | 280/287 |
| 4,757,868 A | * | 7/1988 | Cresswell | 180/11 |
| 6,032,971 A | * | 3/2000 | Herder | 280/278 |
| 6,883,817 B1 | * | 4/2005 | Chu | 280/278 |
| 2002/0175491 A1 | * | 11/2002 | Clark | 280/288.4 |

FOREIGN PATENT DOCUMENTS

EP 296633 A2 * 12/1988

* cited by examiner

*Primary Examiner*—Lesley D. Morris
*Assistant Examiner*—Marlon Arce-Diaz
(74) *Attorney, Agent, or Firm*—Birch, Stewart, Kolasch & Birch, LLP

(57) ABSTRACT

Provided is a folding electric bicycle comprising a front frame section; a rear frame section comprising two bent arms individually having one end pivotably coupled to an axle passed rear wheel, and two auxiliary wheels rotatably mounted in open ends of the bent arms; a crossbar comprising a front end and a rear end pivotably coupled to the front and rear frame sections respectively; a latch detachably interconnected the crossbar and the rear frame section; and a down tube interconnected the front and rear frame sections. The rear frame section can either retract toward the front frame section about the unfastened latch for folding or extend from the front frame section about the unfastened latch for extending. The auxiliary wheels are either disposed above the ground when the bicycle is ready or rotatable and contact with the ground when the bicycle is folded for facilitating moving.

6 Claims, 8 Drawing Sheets

FOLDING ELECTRIC BICYCLE

FIELD OF THE INVENTION

The present invention relates to electric bicycles and more particularly to an electric bicycle capable of being folded for decreasing its storage space, being ease of movement by wheeling by the hand, and obtaining other advantageous features.

BACKGROUND OF THE INVENTION

Conventionally, an electric bicycle comprises a tubular metal frame mounted on two large wire-spoke wheels, one behind the other, a pair of handlebars pivotably mounted on head tube, a drive chain mounted around the wheels, and a drive including a rechargeable battery for powering the rear wheel by rotating the drive chain.

However, the frame of prior electric bicycle is fixed (i.e., not foldable). As such, its storage may occupy a relatively large space. Such is not convenient for the crowded living environment of the city nowadays. Thus, folding electric bicycles are commercially available for meeting such demand. One prior folding electric bicycle A1 is shown in FIG. 1. The bicycle A1 at least comprises a tubular metal frame A11 mounted on two corresponding front and rear wheels A12 and A13, a saddle A14 mounted on a seat post of the frame A11, a pair of handlebars pivotably mounted on a head tube A15, and a crossbar A16 interconnected the front and rear wheels A12 and A13, the crossbar A16 consisting of a front bar A161 and a rear bar A162 adapted to fold with respect to the front bar A161 by means of a folding mechanism A17.

The bicycle A1 is adapted to fold by operating the folding mechanism A17 as shown in its folded state of FIG. 1. As stated above, the bicycle A1 can be folded by the provision of the foldable front and rear bars A161 and A162 and the folding mechanism A17. Also, the folded bicycle A1 indeed has a decreased size for ease of storage and/or shipment. However, the seat post is not adapted to fold. The front wheel A12 is folded toward the rear wheel A13 in which the hub of the former is not aligned with that of the latter. That is, the hub of the rear wheel A13 projects into the front wheel A12. This prohibits a driver from moving the bicycle A1 by wheeling. Instead, the driver has to lift the bicycle A1 by the hand for movement. This is not convenient and can consume much labor.

Thus, it is desirable to provide a folding electric bicycle having reduced storage space, being ease of movement by wheeling by the hand, and having other advantageous features after folding so as to overcome the above drawbacks of the prior art.

SUMMARY OF THE INVENTION

It is therefore an object of the present invention to provide an electric bicycle capable of being folded for decreasing its storage space, and being ease of movement by wheeling by the hand.

The advantages of the present invention are realized by providing a folding electric bicycle comprising a front frame section comprising a front wheel; a rear frame section comprising a rear wheel; a crossbar comprising a front end and a rear end pivotably coupled to the front and rear frame sections respectively; a latch detachably interconnected the crossbar and the rear frame section; and a down tube interconnected the front and rear frame sections, wherein the crossbar comprises a shaft in its front end pivotably connected to the front frame section, and the rear frame section is adapted to either retract toward the front frame section about the unfastened latch for folding or extend from the front frame section about the unfastened latch for extending.

In one aspect of the present invention, the rear frame section comprises two bent arms individually having one end pivotably coupled to an axle passed the rear wheel, and two auxiliary wheels each rotatably mounted in an open end of the bent arm. The auxiliary wheels are disposed above the ground by a predetermined distance when the electric bicycle is in a ready state and the auxiliary wheels are stably when rotating and contact with the ground when the electric bicycle is in a folded state so that moving the folded bicycle can be facilitated by wheeling by the hand.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
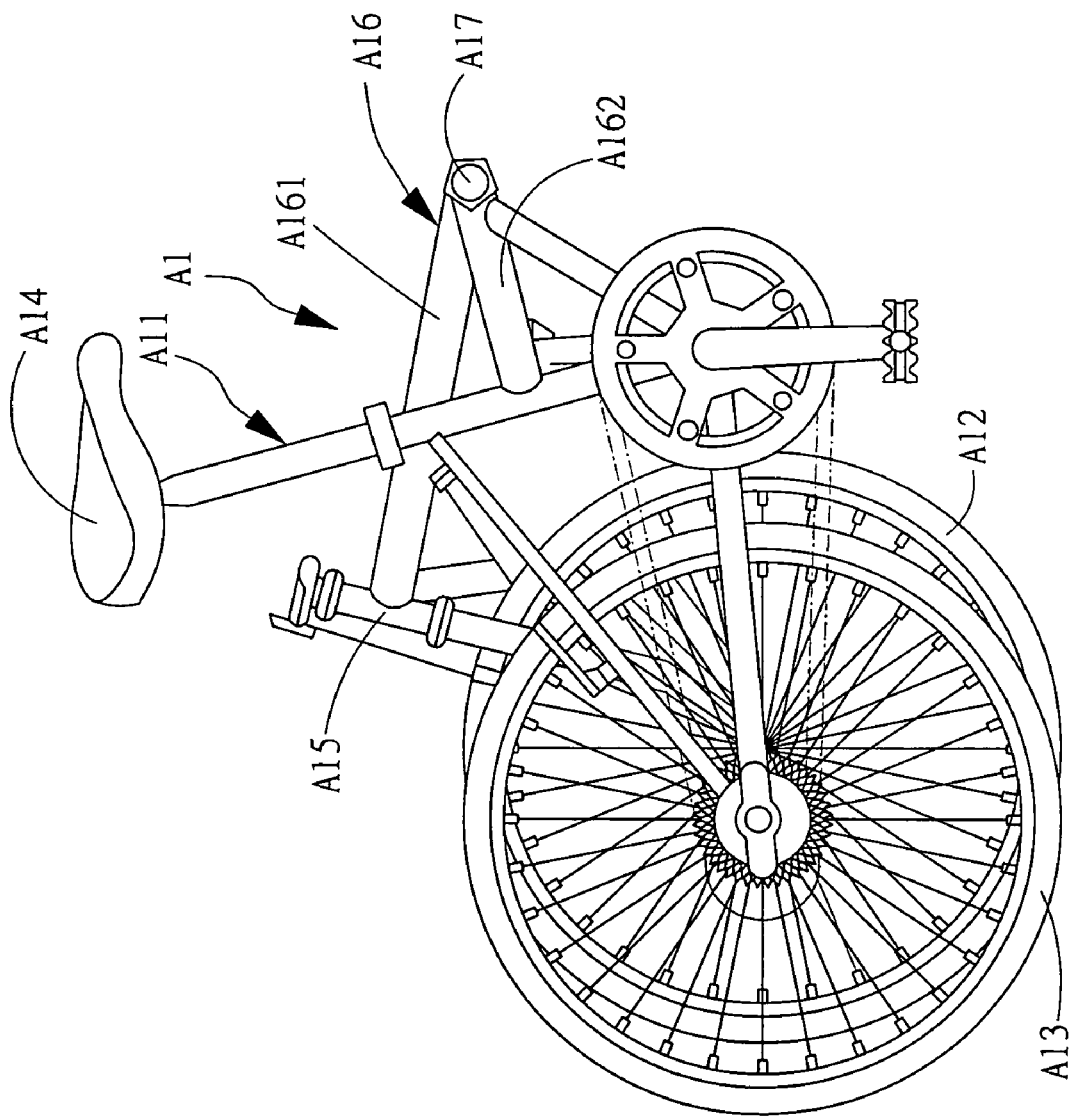
FIG. 1 is a perspective view of a conventional electric bicycle after folding.

Referring to FIGS. 2 to 5, there is shown a folding electric bicycle 1 constructed in accordance with the invention comprising a tubular metal frame consisting of a front frame section 3 and a rear frame section 4, a crossbar 2 including a front end 21 and a rear end 22 coupled to the front frame section 3 and the rear frame section 4 respectively, a latch 5 detachably interconnected the crossbar 2 and the rear frame section 4, and a down tube 6 interconnected the rear frame section 4 and the front frame section 3.

The front frame section 3 comprises an upper arcuate joint 30 pivotably coupled to a front end 21 of the crossbar 2, a lower arcuate joint 31 pivotably coupled to a front end 61 of the down tube 6 by means of a pivot pin 610, and a front wheel 32 rotatably mounted in a lower portion. The front end 21 of the crossbar 2 comprises a shaft 210 interconnected two ends of the upper arcuate joint 30, a pivotal lever 212 coupled to one end of the upper arcuate joint 30, and a hole 211 proximate a free end of the lever 212.

The rear frame section 4 comprises parallel left and right seat stays 40 and 41, a rear wheel 42 rotatably mounted in a rear portion between the left and right seat stays 40 and 41, a transmission 420 provided in a hub of the rear wheel 42, the transmission 420 being powered by a rechargeable battery, two bent arms 43 individually having one end pivotably coupled to an axle passed the hub of the rear wheel 42 and the rear portions of the left and right seat stays 40 and 41, two auxiliary wheels 430 rotatably mounted in rear ends of the bent arms 43, a bifurcation 44 provided in a front end of the rear frame section 4 and pivotably mounted in two ends of the lateral portion (i.e., shaft) of the rear end 22 of the crossbar 2, a seat post 45 substantially extended upwardly from front portions of left and right seat stays 40 and 41 and disposed between them, the seat post 45 being coupled to a rear end of the down tube 6 above the left and right seat stays 40 and 41, a saddle 46 mounted on the seat post 45 by means of a quick release, and an L-shaped lock plate 48 provided at one end of the bifurcation 44 by having its one end fastened at one end of the shaft of the rear end 22 of the crossbar 2, the lock plate 48 including a hole 480 at its intermediate portion below one end of the shaft of the rear end 22 of the crossbar 2.

Figure 4:
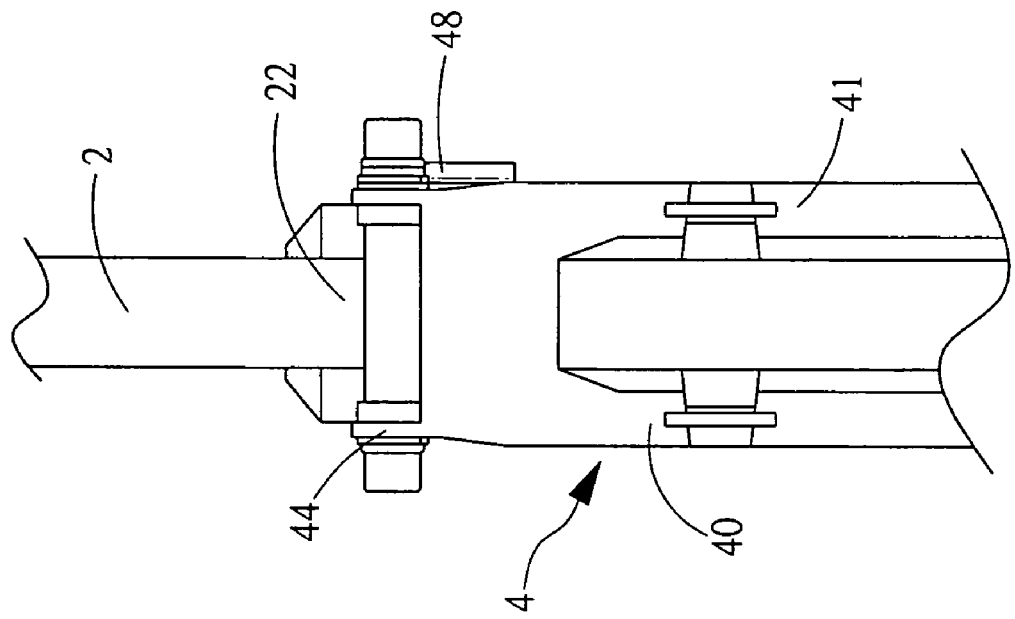
FIG. 4 is a top view of FIG. 3.
Figure 3:
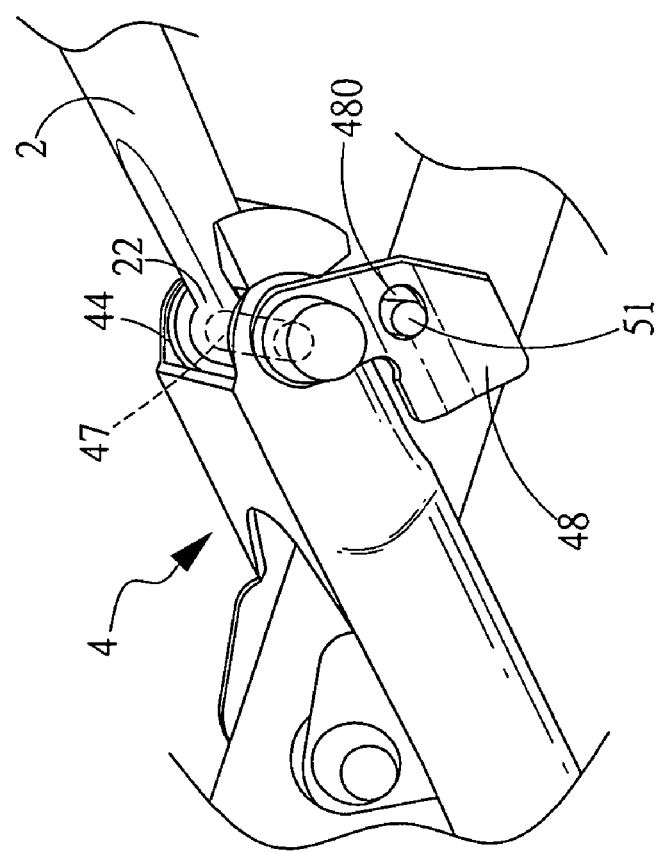
FIG. 3 is a perspective view of an interconnected portion of front and rear frame sections of FIG. 2.

Referring to FIGS. 6 to 10 in conjunction with FIGS. 3 and 4, the latch 5 is disposed laterally and is provided on an intermediate portion of the down tube 6 which passes a front gap between the left and right seat stays 40 and 41. The latch 5 comprises a frame member 50, a lock bar 51 provided across two opposite portions of the frame member 50 and having its one end formed as an enlarged trigger, a spring 52 put on the shank of the lock bar 51 and compressibly disposed between the opposite portions of the frame member 50, and a ring fastener 53 put on a portion of the lock bar 51 proximate the other end of the lock bar 51 and urged against an outer surface of one of the opposite portions of the frame member 50 for assembling the lock bar 51 and the frame member 50 together. A user may pull the trigger of the frame member 50 as indicated by arrow in FIG. 6 to move the lock bar 51 a small distance relative to the frame member 50. The lock bar 51 is disposed below the bifurcation 44. The other end of the lock bar 51 extends through the hole 480 of the lock plate 48 and is anchored thereat. This finishes the mounting and fastening of the rear frame section 4. As such, the rear frame section 4 is adapted to pivot either from an extended position to a fully folded position or vice versa. Moreover, the rear wheel 42 and the front wheel 32 can move toward each other after disengaging the lock bar 51 from the hole 480.

Figure 2:
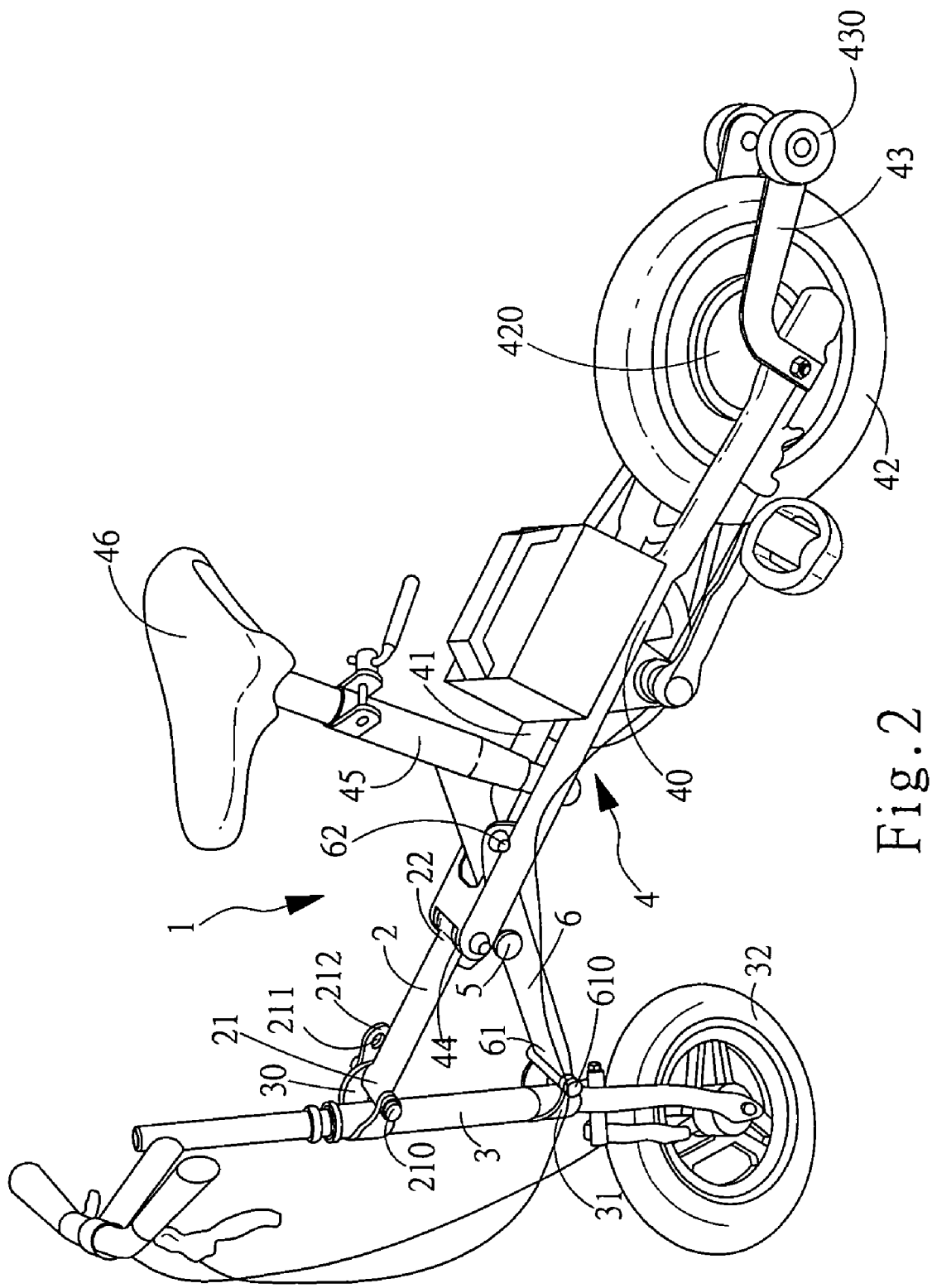
FIG. 2 is a perspective view of a preferred embodiment of folding electric bicycle according to the invention.

Referring to FIG. 2 specifically, the down tube 6 passes the front gap between the left and right seat stays 40 and 41 and comprises a front end 61 pivotably coupled to the front end 21 of the crossbar 2, a rear end fixedly coupled to the seat tube 45, and a pivot pin 62 pivotably mounted across two opposite flanges formed on front portions of the left and right seat stays 40 and 41. As an end, the down tube 6 is adapted to pivot about the left and right seat stays 40 and 41 and is also adapted to pivot about the front frame section 3.

Figure 6:
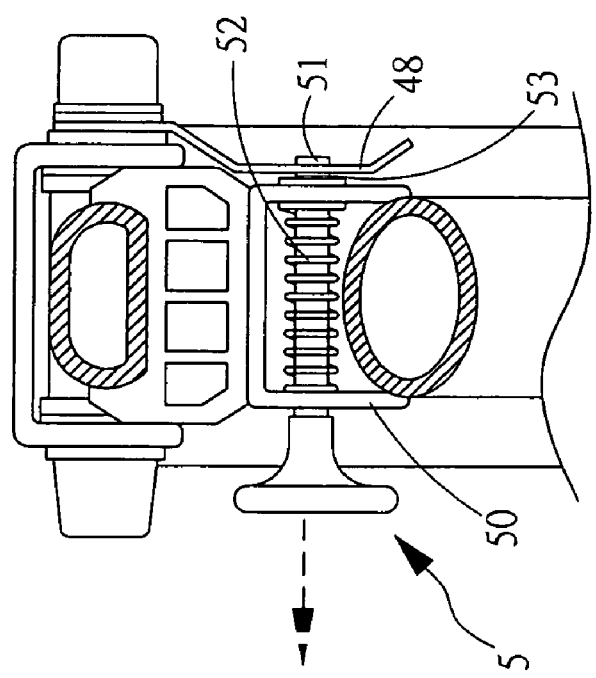
FIG. 6 is a sectional view of latch of FIG. 2.
Figure 5:
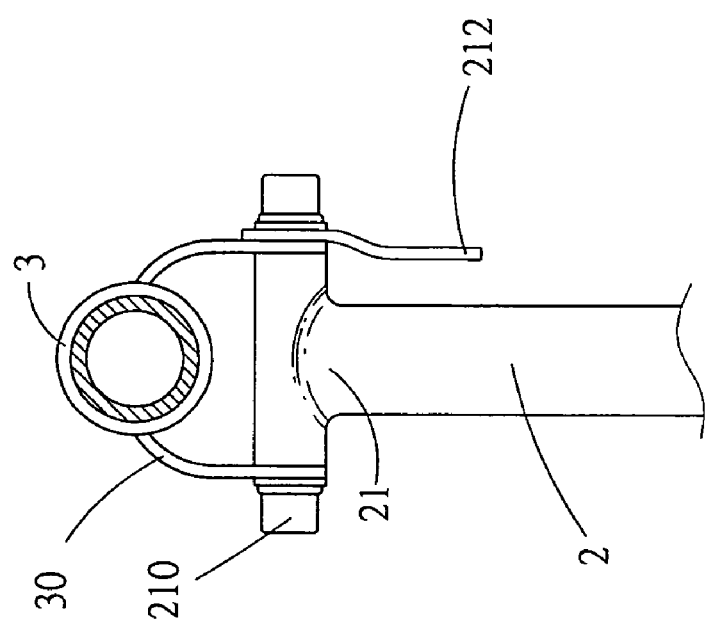
FIG. 5 is a top view in part section of a joining portion of head tube and crossbar.
Figure 8:
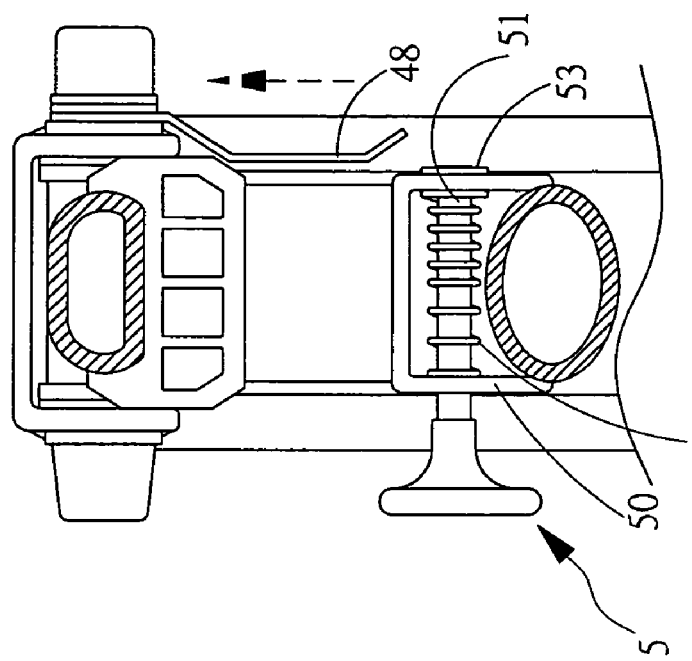
FIG. 8 is a view similar to FIG. 6 where lock bar has been disengaged from lock plate.
Figure 7:
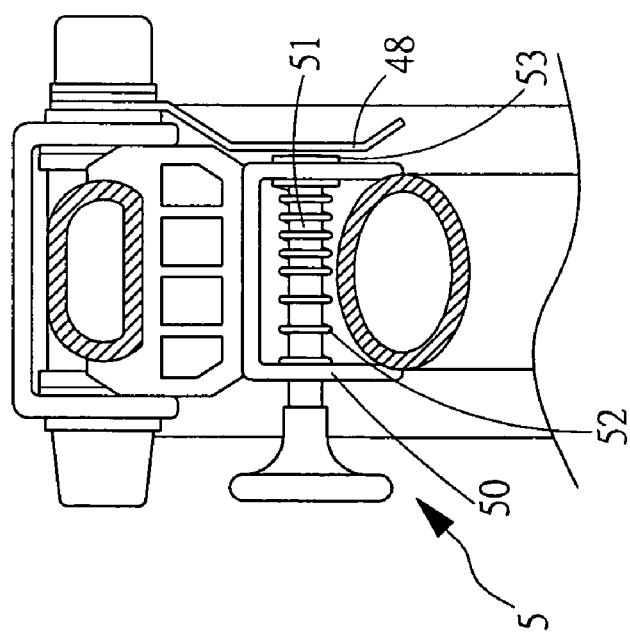
FIG. 7 is a view similar to FIG. 6 where lock bar has been pulled from the position of FIG. 6.
Figure 9:
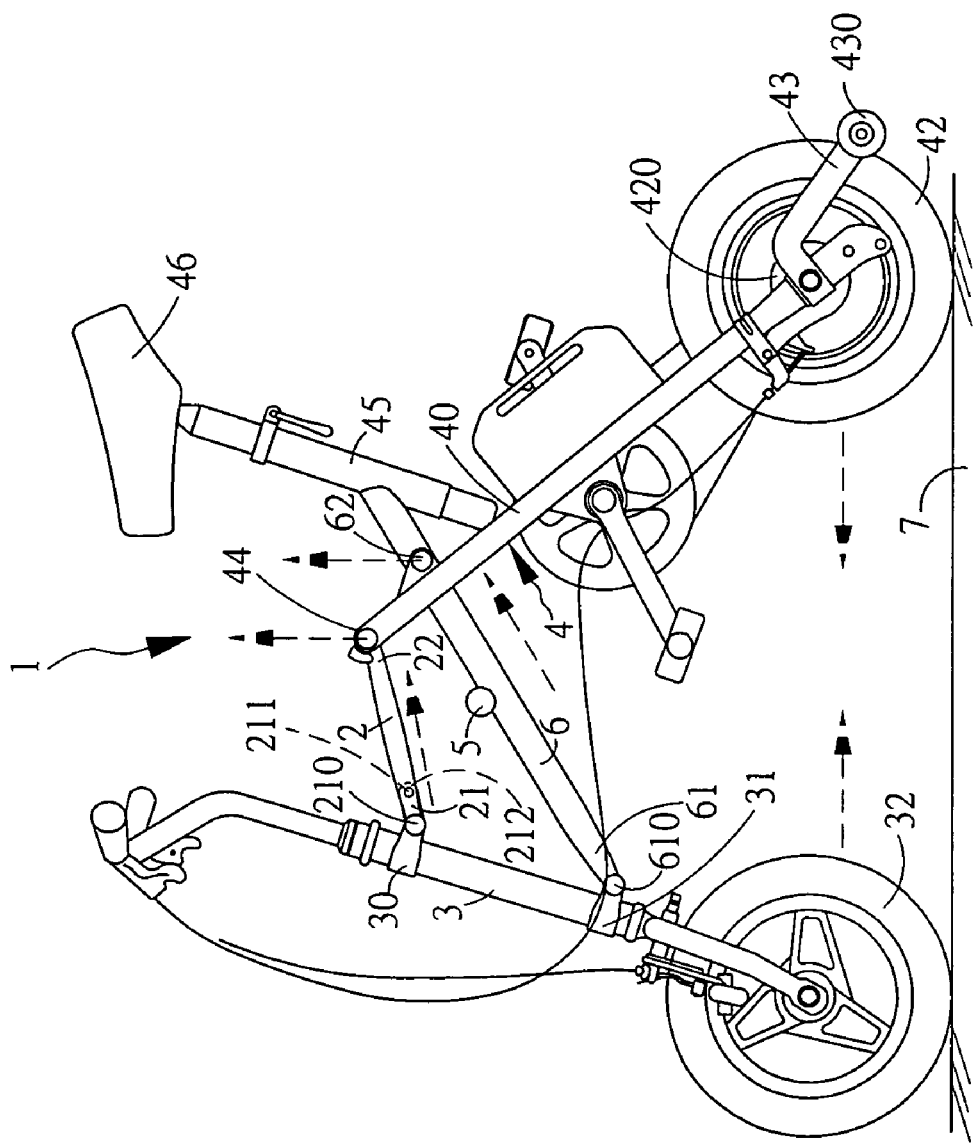
FIG. 9 is a side view illustrating the bicycle of the invention being folded by pushing front and rear frame sections toward each other.

Referring to FIGS. 4 to 11 specifically, for folding the electric bicycle 1 a user may first pull the trigger of the frame member 50 as indicated by arrow in FIG. 6 to move the lock bar 51 a small distance relative to the frame member 50 with the spring 52 being further compressed until the other end of the lock bar 51 clears the hole 480 (see FIGS. 7 and 8). Next, lift the saddle 46 by one hand with the shaft of the rear end 22 of the crossbar 2 across the bifurcation 44 moved upward. At the same time, the rear frame section 4 and the crossbar 2 can pivotably move toward each other. Also, both front and rear wheels 32 and 42 can move toward each other. Finally, insert the other end of the lock bar 51 into the hole 211 in the lever 212 of the crossbar 2 for fastening (see FIGS. 9, 10 and 11). For extending the electric bicycle 1, the steps discussed above are traversed in the opposite direction. Eventually, the front and rear frame sections 3 and 4 are disposed one behind the other, the crossbar 2 is coupled to and aligned with the rear frame section 4, and the other end of the lock bar 51 is inserted into the hole 480 in the lock plate 48 by passing the bifurcation 44.

Figure 10:
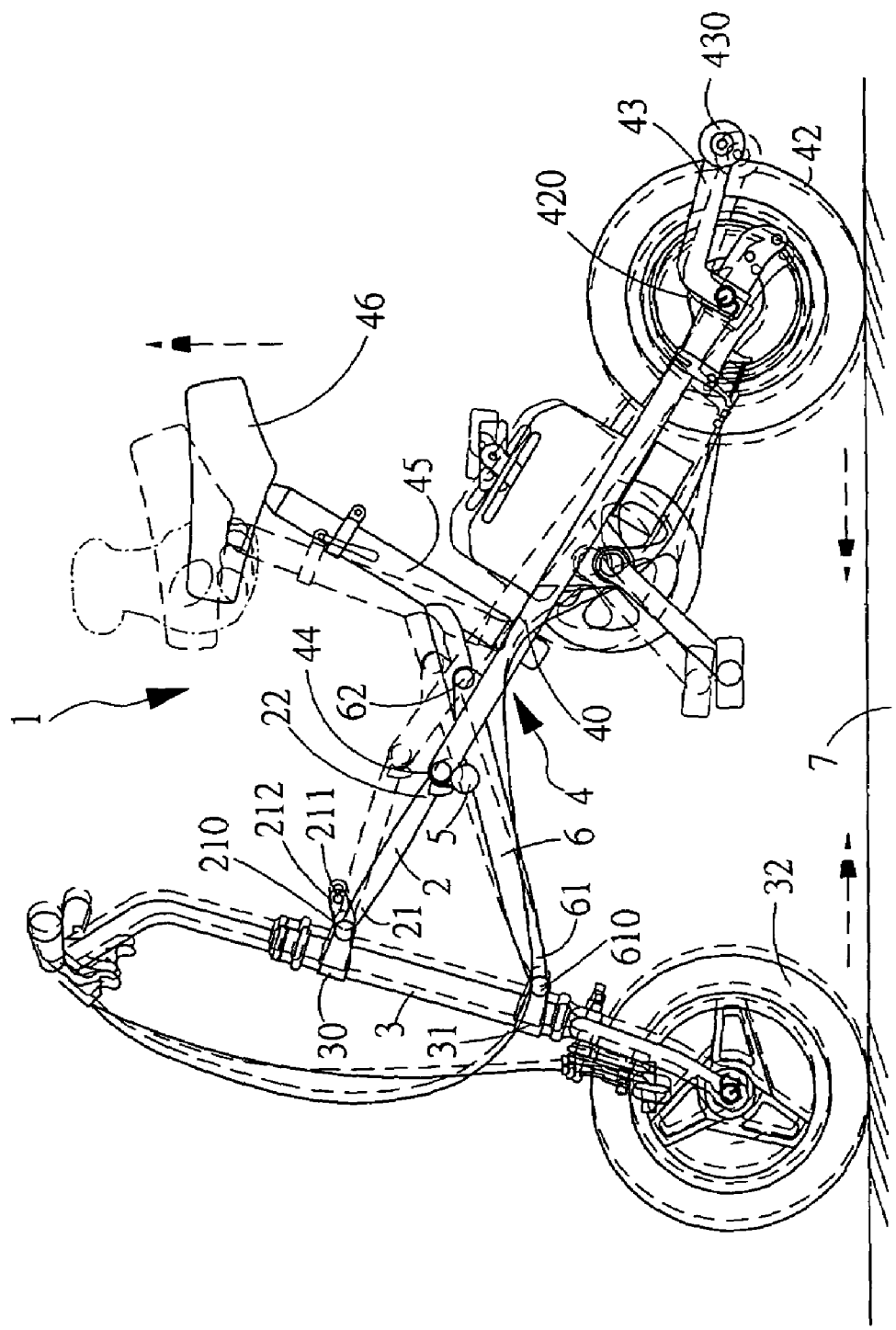
FIG. 10 is a view similar to FIG. 9 showing the bicycle being folded by pushing front and rear wheels toward each other.
Figure 11:
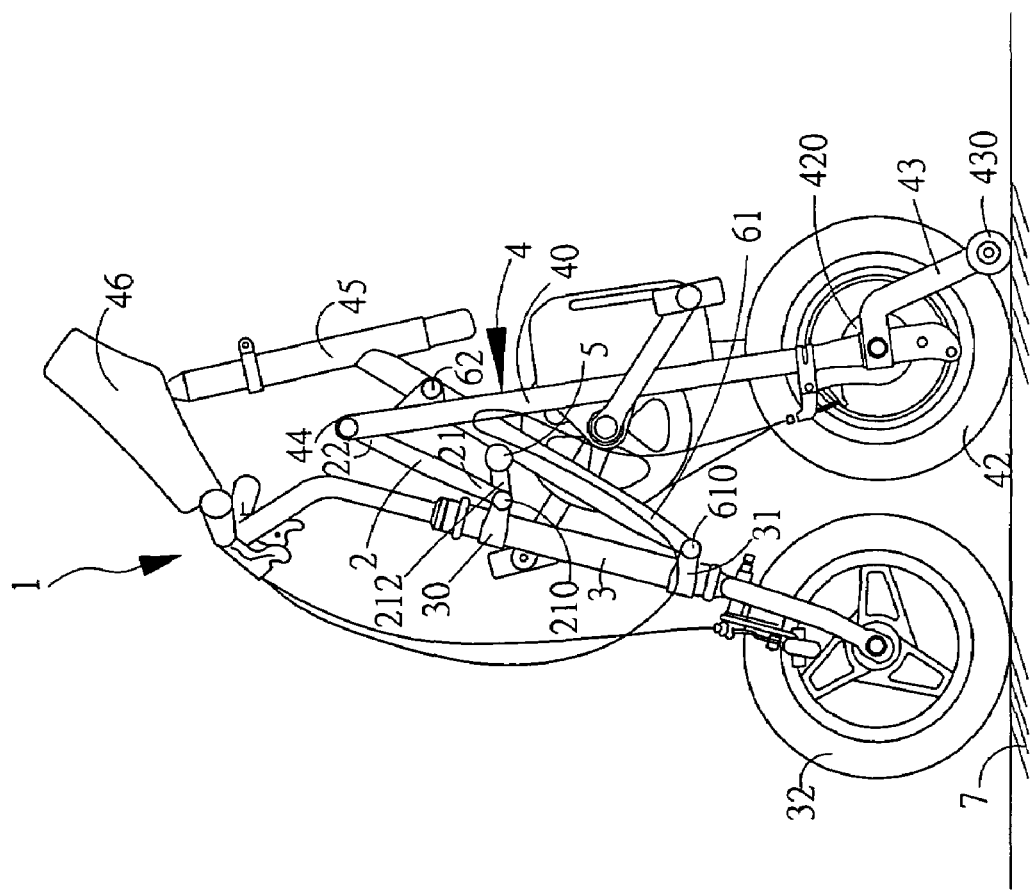
FIG. 11 is a side view of the fully folded bicycle of the invention.

The front and rear wheels 32 and 42 are rotatably disposed on the ground 7 with the auxiliary wheels 430 disposed above the ground 7 by a predetermined distance (see FIG. 10). Referring to FIG. 11 specifically, in the folded state the rear frame section 4, the rear frame section 4 and the crossbar 2 are bent at the shaft passing the bifurcation 44. Also, the down tube 6 pivots counterclockwise about the pivot pin 610 with a distance between the front and rear wheels 32 and 42 being a minimum and the auxiliary wheels 430 rotatable and contact with the ground 7. In this position, the auxiliary wheels 430 can facilitate moving the folded bicycle 1.

In brief, the invention has the following advantages. The electric bicycle 1 is more compact than the prior electric bicycle A1 in the folded state. The provision of the bent arms 43 and the auxiliary wheels 430 can facilitate stably moving the folded bicycle 1 as the auxiliary wheels 430 rotatable and contact with the ground 7. This is a great improvement as compared with the prior electric bicycle A1 which requires a user to exert a great force to lift the folded bicycle A1 by hands for movement in a very inconvenient manner.

While the invention herein disclosed has been described by means of specific embodiments, numerous modifications and variations could be made thereto by those skilled in the art without departing from the scope and spirit of the invention set forth in the claims.

What is claimed is:

1. A folding electric bicycle comprising:
   a front frame section;
   a rear frame section;
   a crossbar comprising a front end and a rear end pivotably coupled to the front and rear frame sections respectively;
   a latch detachably interconnected the crossbar and the rear frame section; and
   a down tube interconnected the front and rear frame sections,
   wherein the crossbar comprises a shaft in its front end pivotably connected to the front frame section, and the rear frame section is adapted to either retract toward the front frame section about the unfastened latch for folding or extend from the front frame section about the unfastened latch for extending,
   wherein the front frame section comprises an upper arcuate joint pivotably coupled to a front end of the crossbar by means of the shaft, a lower arcuate joint pivotably coupled to a front end of the down tube by means of a pivot pin, and the front end of the crossbar further comprises a pivotal lever coupled to one end of the upper arcuate joint, and an aperture proximate a free end of the lever.

2. The folding electric bicycle of claim 1, wherein the rear frame section comprises parallel left and right seat stays, a front bifurcation pivotably mounted in the rear end of the crossbar, two bent arms individually having one end pivotably coupled to an axle passed rear portions of the left and right seat stays, and a lock plate provided at one end of the bifurcation by having its one end fastened at one end of the rear end of the crossbar.

3. The folding electric bicycle of claim 2, wherein each of the bent arms comprises an auxiliary wheel rotatably mounted in its open end.

4. The folding electric bicycle of claim 2, wherein the lock plate is L-shaped and the lock plate comprises a hole in its intermediate portion below the rear end of the crossbar.

5. The folding electric bicycle of claim 1, wherein the latch comprises a frame member, a lock bar provided across two opposite portions of the frame member, a spring put on a shank of the lock bar and compressibly disposed between the opposite portions of the frame member, and a ring fastener put on a portion of the lock bar proximate the other end of the lock bar and urged against an outer surface of one of the opposite portions of the frame member.

6. The folding electric bicycle of claim 1, wherein the down tube passes a front gap between the left and right seat stays.

* * * * *